United States Patent
Yankovich

(10) Patent No.: US 11,040,742 B1
(45) Date of Patent: Jun. 22, 2021

(54) TRAILER WITH FENDER BOX

(71) Applicant: LGS Pace, LLC, Middlebury, IN (US)

(72) Inventor: Franklyn M Yankovich, Bristol, IN (US)

(73) Assignee: LGS Pace, LLC, Middlebury, IN (US)

( * ) Notice: Subject to any disclaimer, the term of this patent is extended or adjusted under 35 U.S.C. 154(b) by 0 days.

(21) Appl. No.: 16/526,134

(22) Filed: Jul. 30, 2019

Related U.S. Application Data

(63) Continuation-in-part of application No. 16/117,029, filed on Aug. 30, 2018.

(60) Provisional application No. 62/553,175, filed on Sep. 1, 2017.

(51) Int. Cl.
   *B62D 25/18* (2006.01)

(52) U.S. Cl.
   CPC .................................. *B62D 25/182* (2013.01)

(58) Field of Classification Search
   CPC .... B62D 25/18; B62D 25/16; B62D 25/2036; B62D 25/182; B62D 25/20; B62D 25/184; B62D 25/00; B62D 25/24; B62D 25/02; B62D 63/08; B62D 63/06; B60R 19/38; B60R 19/00; B60R 2019/002
   See application file for complete search history.

(56) References Cited

U.S. PATENT DOCUMENTS

| | | | |
|---|---|---|---|
| 3,326,595 A * | 6/1967 | Ogilvie | B60R 9/02 296/37.6 |
| 3,406,999 A * | 10/1968 | Kozicki | B60P 3/36 296/156 |
| 3,620,564 A | 11/1971 | Wenger et al. | |
| 3,850,470 A * | 11/1974 | Trelle | B60P 3/32 296/175 |
| 4,789,195 A | 12/1988 | Fletcher | |
| 4,830,421 A * | 5/1989 | Hawelka | A62C 27/00 296/24.45 |
| 4,948,169 A | 8/1990 | Amundson | |
| 5,016,897 A | 5/1991 | Kauffman | |
| 5,029,935 A * | 7/1991 | Dufrancatel | B60P 3/36 126/276 |
| 5,125,710 A | 6/1992 | Gianelo | |
| 5,193,878 A | 3/1993 | Weaver | |
| 5,284,349 A * | 2/1994 | Bruns | B60R 3/02 182/91 |
| 5,417,468 A | 5/1995 | Baumgartner et al. | |
| 5,458,353 A * | 10/1995 | Hanemaayer | B60P 3/36 280/164.1 |
| 5,772,270 A | 6/1998 | Hanser et al. | |
| 5,833,296 A | 11/1998 | Schneider | |
| 5,845,952 A * | 12/1998 | Albertini | B60P 3/14 296/37.6 |
| 5,984,396 A | 11/1999 | Schneider | |
| 6,012,754 A | 1/2000 | Clare et al. | |
| 6,030,018 A | 2/2000 | Clare et al. | |
| 6,059,341 A | 5/2000 | Jensen et al. | |
| 6,109,683 A | 8/2000 | Schneider | |
| 6,129,401 A | 10/2000 | Neag et al. | |
| 6,135,526 A | 10/2000 | Reckner, Jr. | |
| 6,382,650 B1 | 5/2002 | Farkash | |

(Continued)

*Primary Examiner* — James M Dolak
(74) *Attorney, Agent, or Firm* — Barnes & Thornburg LLP

(57) ABSTRACT

A vehicle includes a frame, a floor, a wheel, and a fender box. The fender box is moveable from a first position in which the fender box is located adjacent the wheel to a second position in which the fender box is spaced apart from the wheel.

9 Claims, 18 Drawing Sheets

(56) References Cited

U.S. PATENT DOCUMENTS

| | | | |
|---|---|---|---|
| 6,439,634 | B1 | 8/2002 | Jensen et al. |
| 6,464,276 | B1* | 10/2002 | Gruich .................. B60R 9/00 |
| | | | 224/402 |
| 6,502,893 | B1 | 1/2003 | Corliss, Jr. |
| 6,527,324 | B2 | 3/2003 | McManus et al. |
| 6,655,723 | B2 | 12/2003 | Meijer et al. |
| 6,705,680 | B2* | 3/2004 | Bombardier ........... B62D 33/02 |
| | | | 224/401 |
| 6,708,454 | B1 | 3/2004 | Frerichs et al. |
| 6,814,384 | B2* | 11/2004 | Grafton .................. B60R 9/00 |
| | | | 296/37.6 |
| 6,938,939 | B2 | 9/2005 | Blodgett, Jr. |
| 6,966,593 | B2 | 11/2005 | Plentis et al. |
| 6,976,721 | B2 | 12/2005 | Rasmussen |
| 7,118,150 | B2 | 10/2006 | Bruford et al. |
| 7,182,177 | B1* | 2/2007 | Simnacher ............... B66F 3/12 |
| | | | 187/211 |
| 7,240,942 | B2* | 7/2007 | Grafton .................. B60R 9/00 |
| | | | 224/404 |
| 7,410,205 | B2 | 8/2008 | Cardwell et al. |
| 7,686,381 | B1 | 3/2010 | Leonard |
| 7,841,645 | B2 | 11/2010 | Diamond et al. |
| 8,393,665 | B2* | 3/2013 | Villano .................. B60R 11/06 |
| | | | 224/403 |
| 8,528,962 | B2 | 9/2013 | Wilkie et al. |
| 8,844,779 | B2* | 9/2014 | Cha ........................ B60R 3/02 |
| | | | 224/491 |
| 8,979,102 | B1 | 3/2015 | Prentice |
| 9,446,702 | B2 | 9/2016 | Nash |
| 9,457,726 | B1 | 10/2016 | Hill |
| 9,745,002 | B2* | 8/2017 | Eddings, Jr. ....... B62D 33/0207 |
| 9,862,333 | B1* | 1/2018 | Jones .................... B60R 11/06 |
| 10,676,144 | B2* | 6/2020 | Barnes ................ B62D 63/064 |
| 2015/0137555 | A1 | 5/2015 | Garceau |
| 2016/0243974 | A1 | 8/2016 | Goode et al. |

* cited by examiner

TRAILER WITH FENDER BOX

This application is a continuation in part of, and claims priority of, U.S. patent application Ser. No. 16/117,029 filed Aug. 30, 2018 and claims priority of U.S. Provisional Patent Application No. 62/553,175 filed Sep. 1, 2017.

BACKGROUND

The present invention relates to trailers and, in particular, to trailers with one or more fender boxes.

Both open and enclosed trailers for transporting cargo of various types are known. For example, such trailers may be utilized to transport an automobile or other vehicle. The trailers often include a ramp so that the vehicle may be driven onto the floor of the trailer. The trailers also often include fender boxes to prevent dirt, rocks and other debris from being propelled by the trailer wheels into or onto the cargo (such as a vehicle). It is often the case that the fender boxes extend into the cargo area of the trailer and above the floor of the trailer. The position of the trailer box may make it difficult to exit a vehicle after it has been driven onto the trailer without striking the fender box with the vehicle door when it is opened so that the driver can exit the vehicle.

SUMMARY OF THE INVENTION

In one embodiment of the present invention, a vehicle includes a floor, a front wall, a rear wall, a first side wall, a second side wall, an opening in one of the side walls, a door attached to the side wall, a fender box, a first slide mechanism and a second slide mechanism. The door is moveable from an open position to a closed position for selectively providing access to the interior of the vehicle through the opening. The fender box is moveable from a first position in which the fender box is located inside the vehicle to a second position in which the fender box is located outside the vehicle. Each of the slide mechanisms is connected to the door and to the fender box.

In one embodiment of the invention, the fender box is moveable from a lowered position within the vehicle to a raised position within the vehicle. In another embodiment, the vehicle further includes a locking mechanism for retaining the fender box in the raised position. In yet another embodiment, the fender box moves along the first and second slide mechanisms as the fender box moves from the lowered position to the raised position.

In one embodiment, the fender box is moveable from a location adjacent the floor of the vehicle to a location above the floor of the vehicle when the fender box is inside the vehicle.

In one embodiment, the fender box is located inside the vehicle when the door is closed and is located outside the vehicle when the door is open.

In another embodiment, the vehicle further includes at least one gas spring connected to the fender box for assisting movement of the fender box from the lowered position to the raised position.

In one embodiment, the vehicle also includes at least one linkage connected to the fender box, a drive shaft connected to the at least one linkage, and a handle assembly connected to the drive shaft. The linkage may include first and second members, each of which has a first end and a second end. The first end of the first member is connected to the fender box, the second end of the first member is pivotally connected to the first end of the second member and the second end of the second member is connected to the drive shaft.

In one embodiment, the handle assembly includes a housing, a linking shaft connected to the housing and to the drive shaft, and a handle having a first end connected to the linking shaft. The handle assembly may also include a latch for selectively preventing and permitting rotation of the handle.

In one embodiment of the present invention, a vehicle includes a floor, a front wall, a rear wall, a first side wall, a second side wall, an opening in one of the side walls, a door attached to the side wall, a fender box, a first slide mechanism, a second slide mechanism, a first linkage, a second linkage, a drive shaft and a handle assembly. The door is moveable from an open position to a closed position for selectively providing access to the interior of the vehicle through the opening. The fender box is moveable from a lowered position within the vehicle to a raised position within the vehicle and from a first position in which the fender box is located inside the vehicle to a second position in which the fender box is located outside the vehicle. The first and second slide mechanisms are connected to the door and to the fender box such that the fender box is movable along the first and second slide mechanisms as the fender box moves from the lowered position to the raised position. Each of the first and second linkages has a first member and a second member. Each of the first and second members has a first end and a second end. The first end of the first member is connected to the fender box and the second end of the first member is pivotally connected to the first end of the second member. The drive shaft is connected to the first linkage and to the second linkage. The handle assembly includes a housing, a linking shaft connected to the housing and to the drive shaft, and a handle having a first end connected to the linking shaft.

In one embodiment, the handle assembly includes a latch for retaining the handle in a first position and for releasing the handle from the first position so as to permit rotation of the handle. The handle assembly may include a housing and the latch can be pivotally connected to the housing. In another embodiment, the handle includes an opening and the latch extends through the opening in the handle. In certain embodiments, the latch includes a notch for engaging a portion of the handle when the handle is in the first position.

In one embodiment, rotating the handle rotates the drive shaft, thereby causing the first and second members of the first and second linkages to pivot with respect to each other and move the fender box from the lowered position to the raised position.

In another embodiment, rotating the handle rotates the linking shaft and the drive shaft, thereby causing the first and second members of the first and second linkages to pivot with respect to each other and move the fender box from the lowered position to the raised position.

In one embodiment, the vehicle includes a locking mechanism for retaining the fender box in the raised position. In one embodiment, the locking mechanism includes a torsion spring.

In one embodiment, the fender box is located inside the vehicle when the door is closed and is located outside the vehicle when the door is open.

These and other features of the present invention will be apparent to those of skill in the art from the following description and accompanying drawings.

DETAILED DESCRIPTION OF EMBODIMENTS OF THE INVENTION

Figure 1:
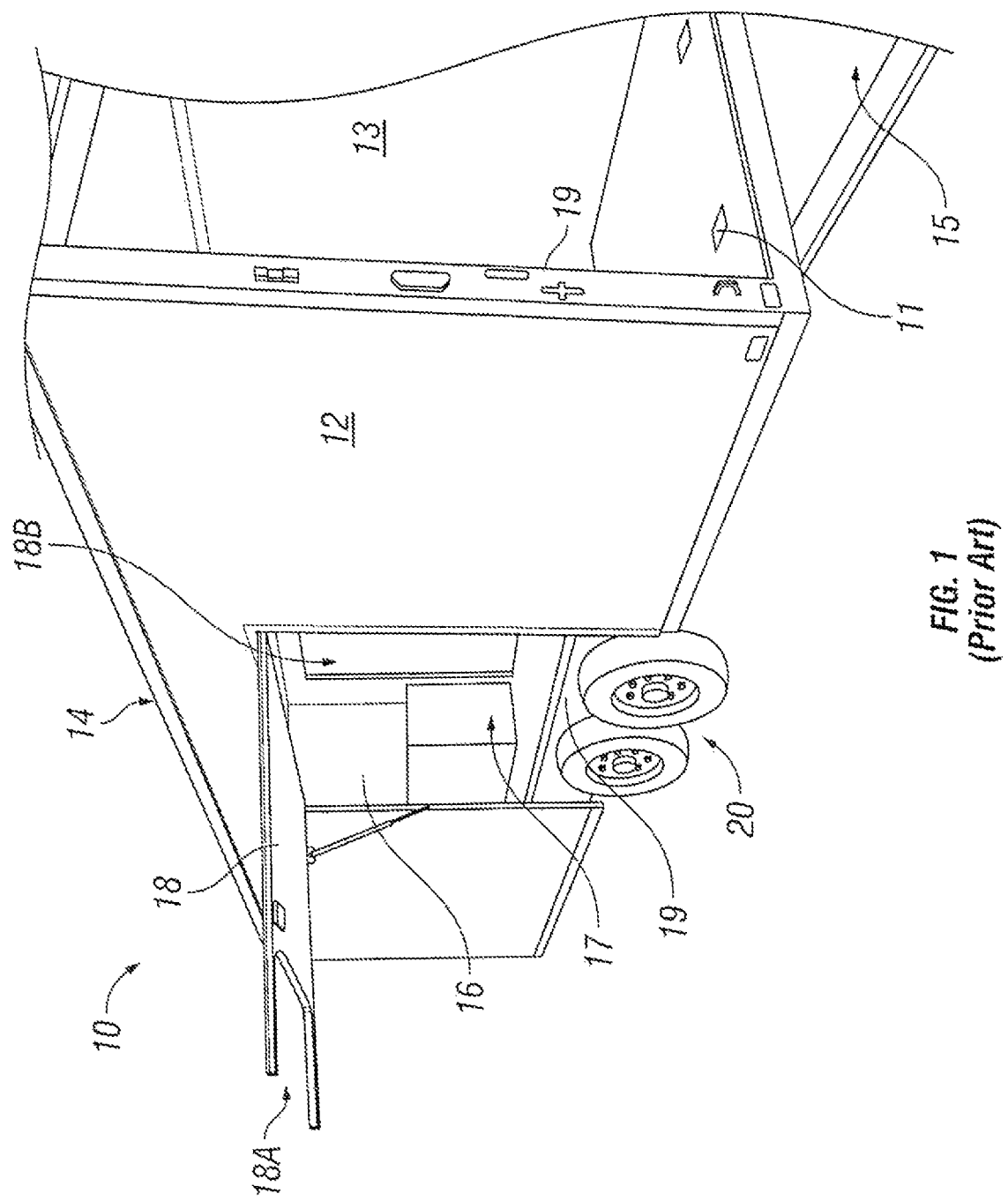
FIG. 1 is a perspective view of a prior art trailer.
Figure 2:
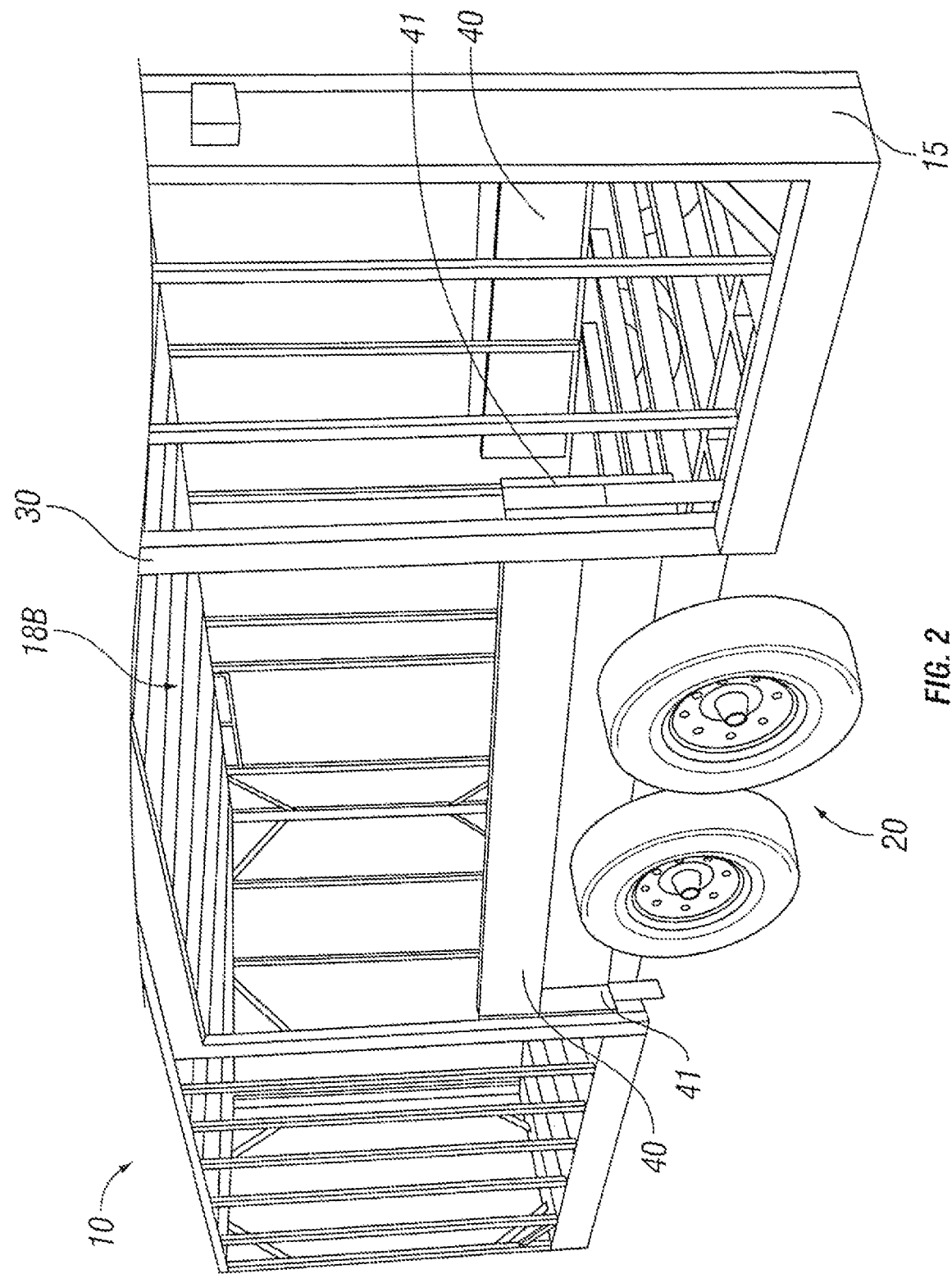
FIGS. 2-5 are perspective views of a trailer with a fender box according to one embodiment of the present invention.
Figure 3:
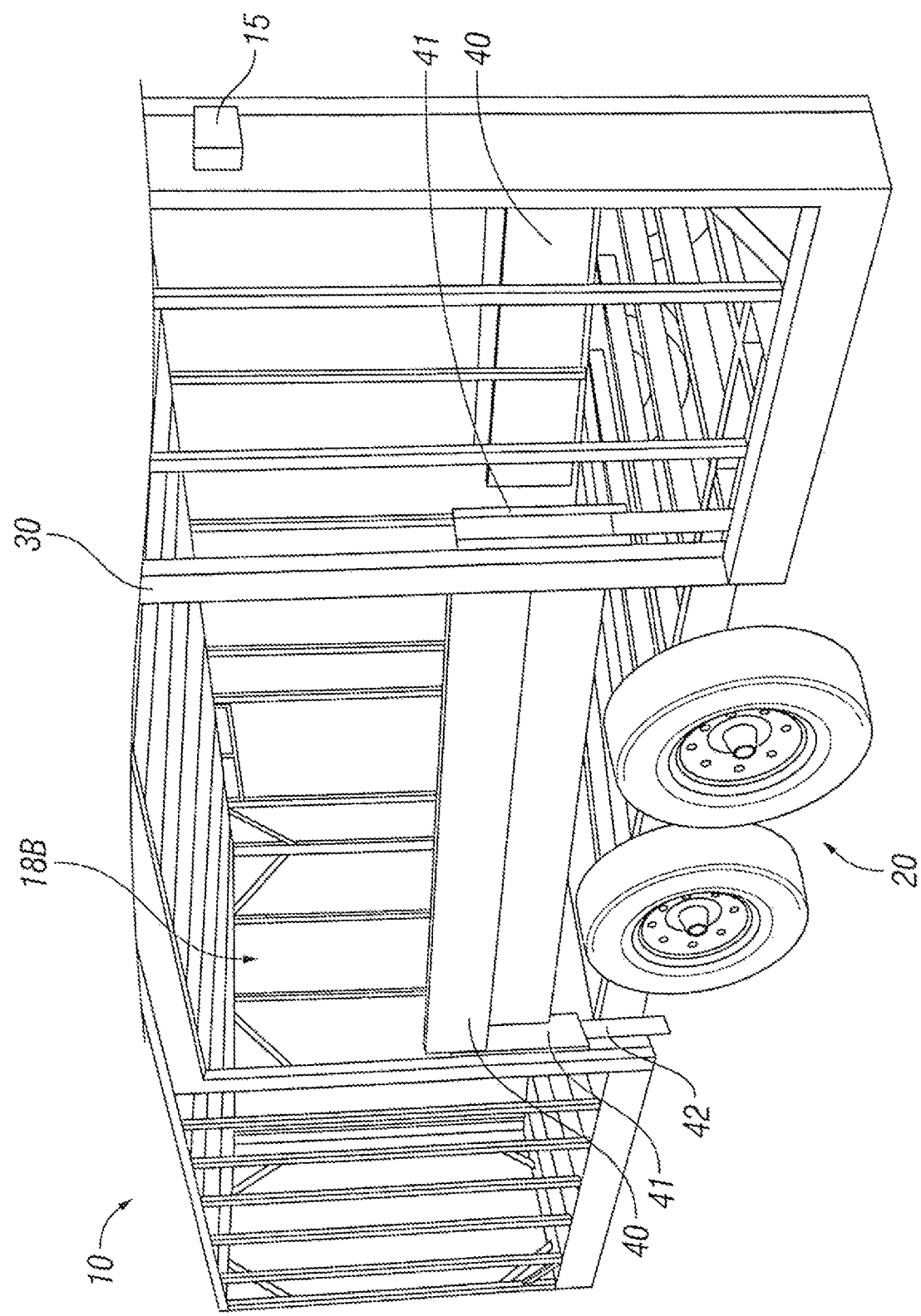

Referring to FIG. 1, a prior art trailer 10 includes a floor 11, a first side wall 12, a second side wall 13, a roof 14, a folding ramp door 15, a front wall 16, a cargo area 17, a side door 18 having a cutout section 18A for selectively providing access through side wall opening 18B, two fender boxes 19 and wheels 20. Wheels 20 are positioned such that they would extend into and be exposed to cargo area 17 if fender boxes 19 did not cover wheels 20.

Figure 4:
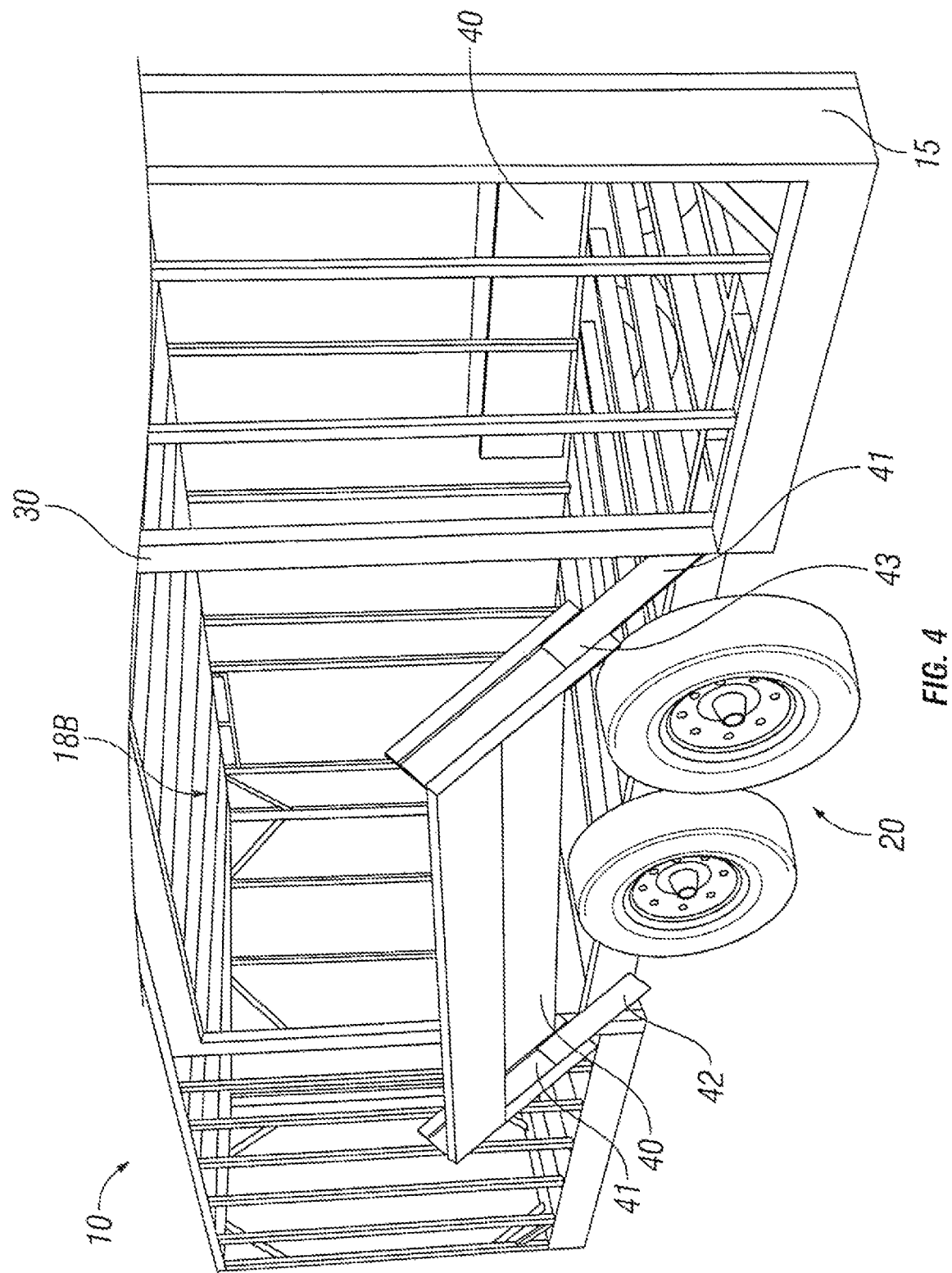
Figure 5:
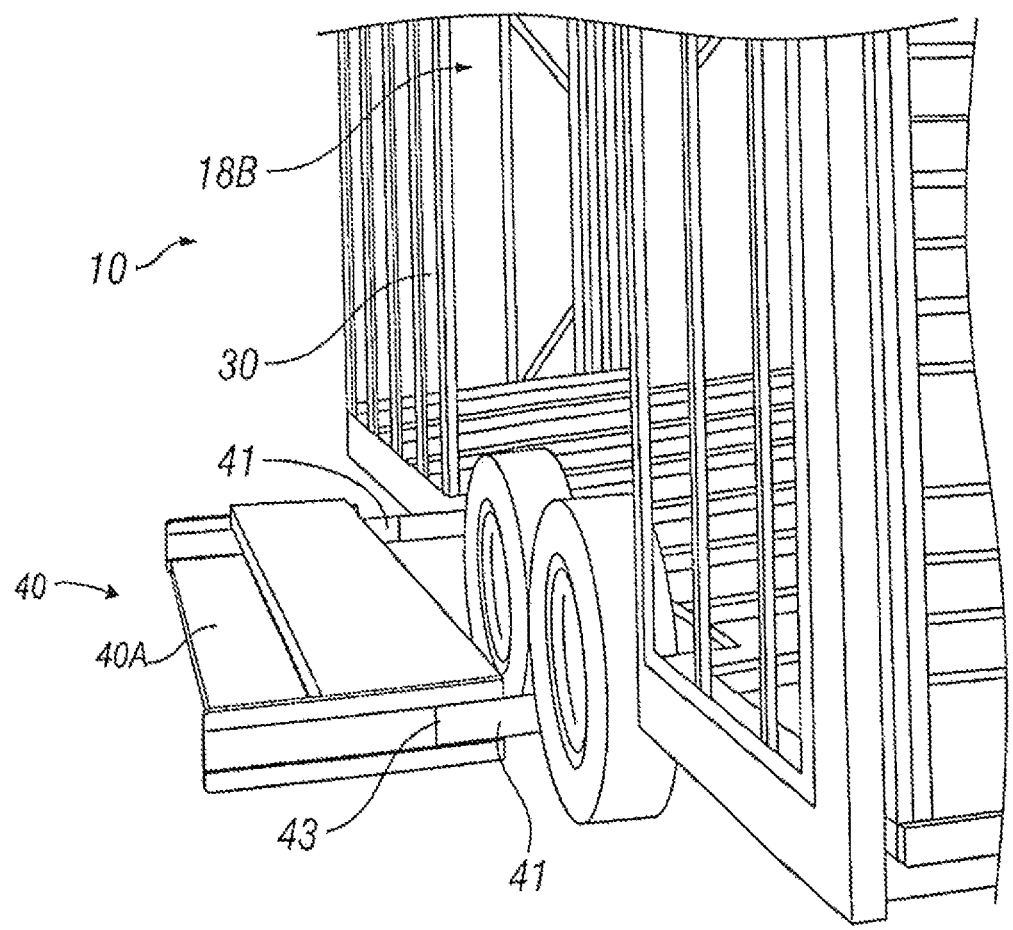

FIGS. 3-6 illustrate a trailer with fender boxes according to one embodiment of the present invention. Note that in these figures the floor, roof, side walls, front wall and ramp door have been removed to expose trailer frame 30. In this embodiment, fender boxes 40 are connected to frame 30 by a pair of slide mechanisms 41. Fender boxes 40 include a stepped surface 40A. Slide mechanisms 41 have a first end 42 pivotally connected to frame 30 and a second end 43 connected to fender box 40. Fender box 40 can be positioned outside of trailer 10 by raising fender box 40 upward via slide mechanisms 41 (FIG. 3) and pivoting fender box 40 outwardly through side wall opening 18B as shown in FIGS. 4 and 5. If desired, fender box 40 can then be moved along slide mechanisms 41 so as to be positioned adjacent wheels 20 for use as a step.

Figure 6:
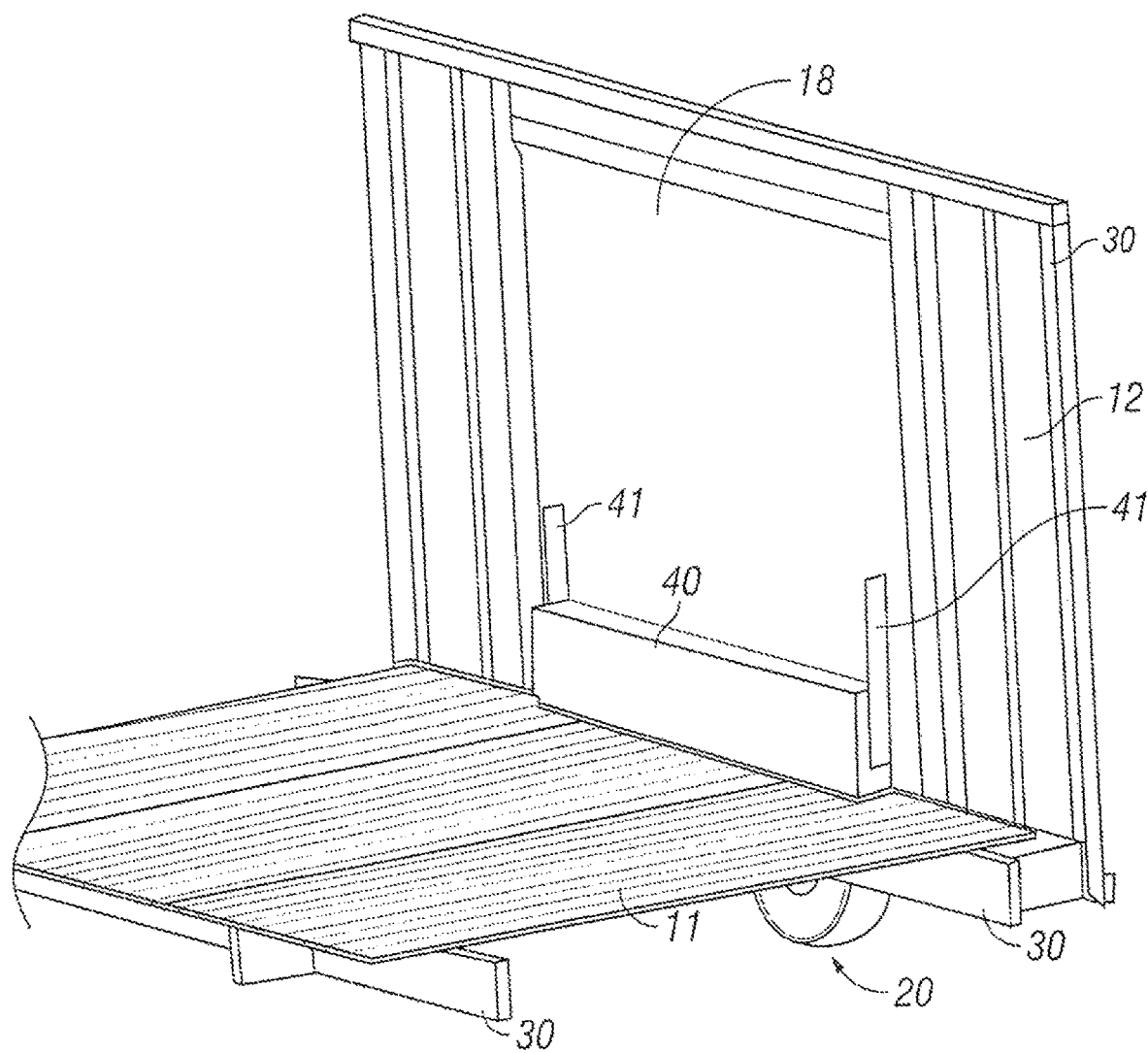
FIGS. 6-8 are perspective views of a trailer with a fender box according to another embodiment of the present invention.
Figure 7:
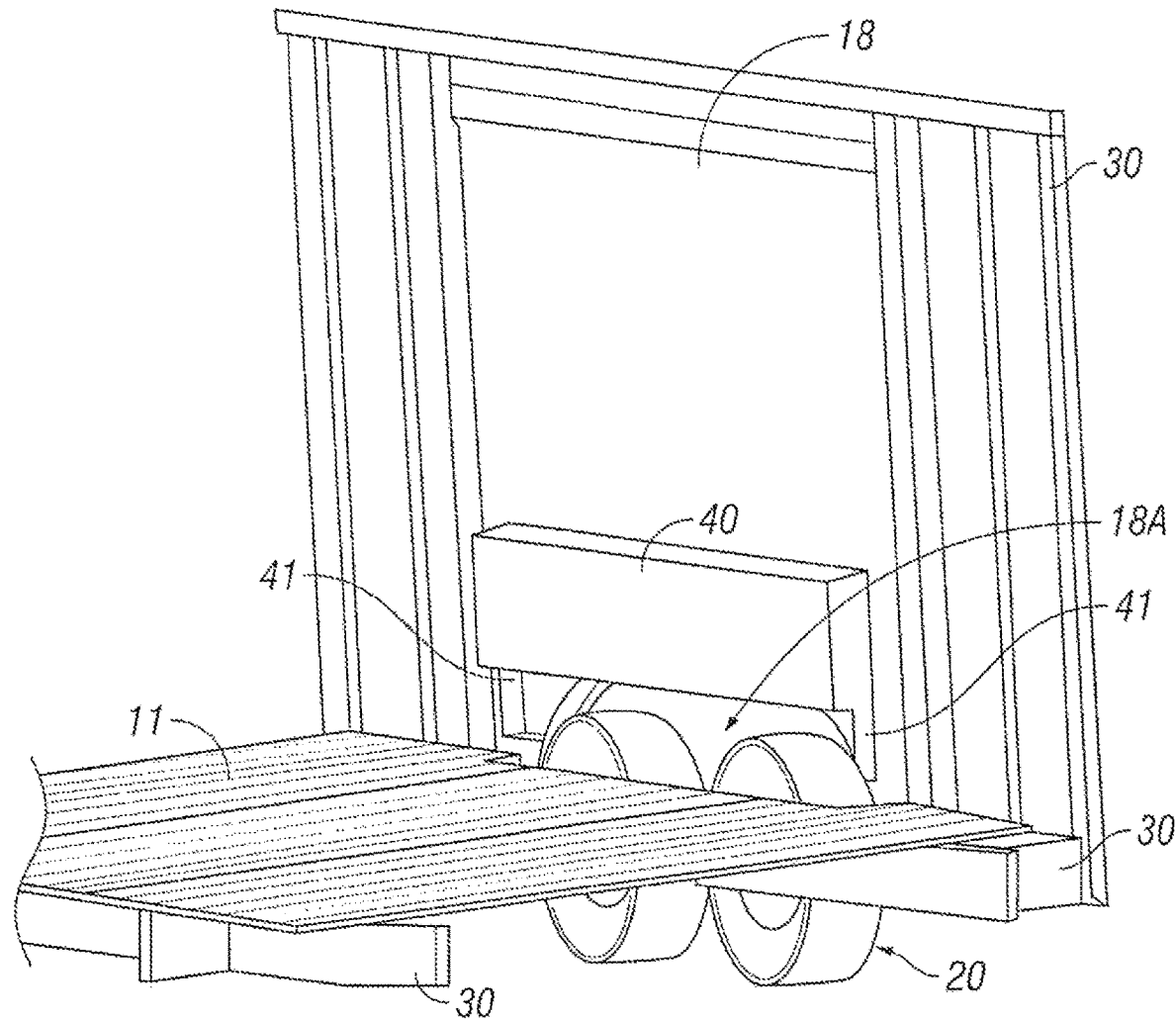
Figure 8:
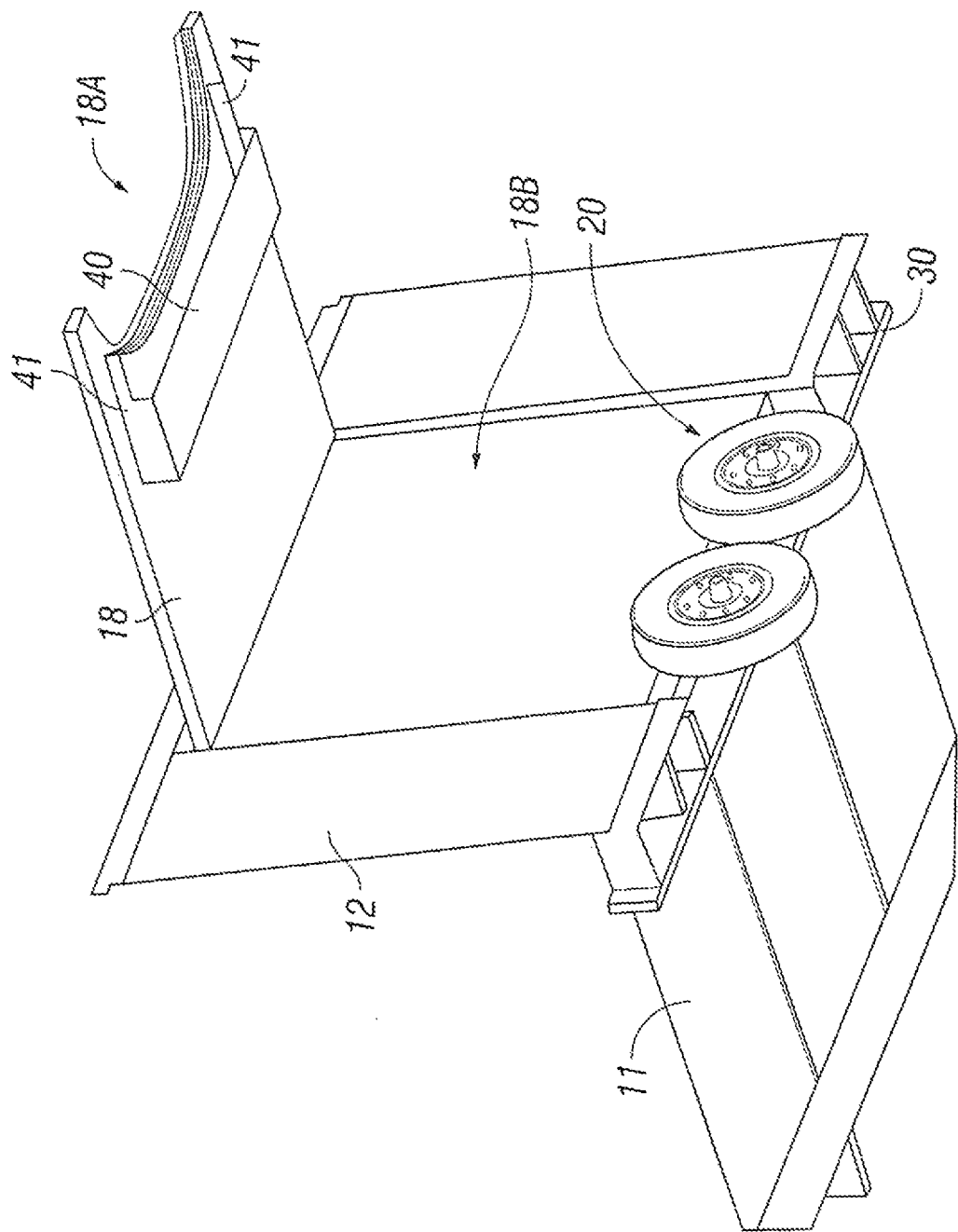
Figure 9:
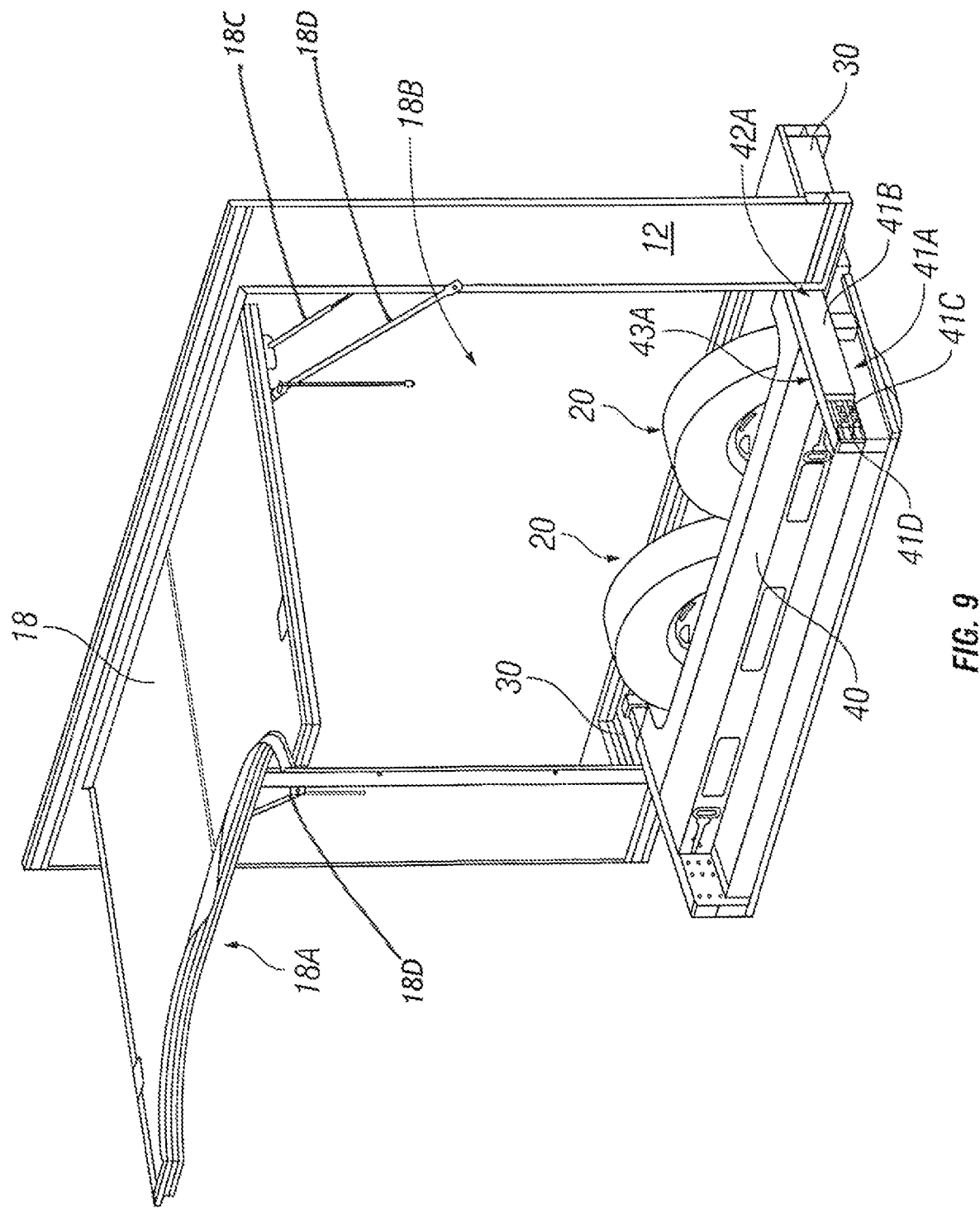
FIG. 9 is a perspective view of a trailer with a fender box according to another embodiment of the present invention.

FIGS. 6-8 illustrate another embodiment of the present invention. In this embodiment, slide mechanisms 41 secure fender box 40 to the inside of door 18. Note that in this embodiment, fender box 40 is not pivotally secured to door 18 but can slide along slide mechanisms 41. In this embodiment, prior to opening door 41, fender box 40 is slid upwardly on slide mechanisms 41 as shown in FIG. 7. Note that fender box 40 and/or slide mechanisms 41 may be provided with a locking mechanism to hold fender box 40 in the position shown in FIG. 7. After fender box 40 is raised as shown in FIG. 7, door 18 may be pivoted open as shown in FIG. 8. In this embodiment, door 18 is provided with two gas springs 18C (one of which is shown in FIG. 9) to assist with raising door 18. This embodiment of the invention also includes two props 18D that can be secured at one end to door 18 and at the opposite end to first side wall 12 to hold door 18 in the open position in the event that one or more of gas springs 18C fail.

Figure 10:
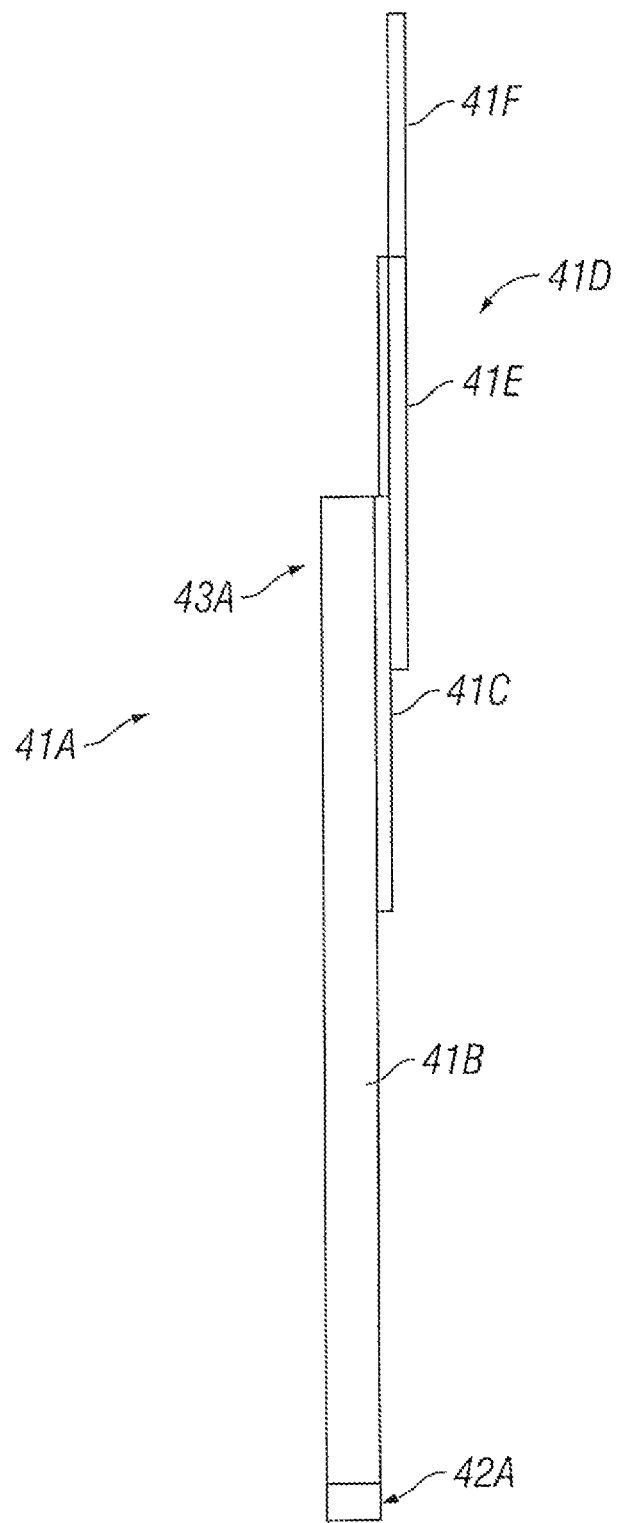
FIG. 10 is atop plan view of a slide mechanism that is a component of the trailer with a fender box shown in FIG. 9.
Figure 11:
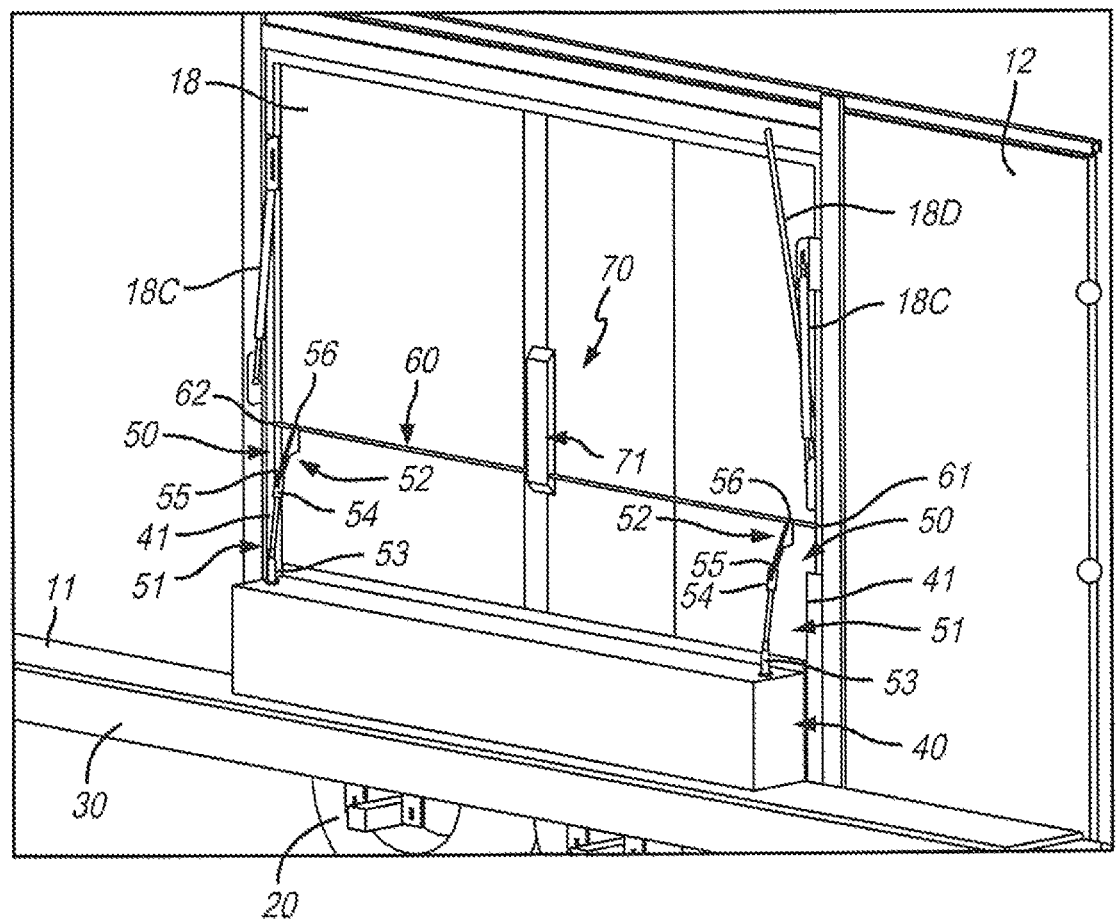
FIG. 11 is an interior perspective view of a trailer with a fender box according to another embodiment of the present invention with the fender box in the lowered position.
Figure 12:
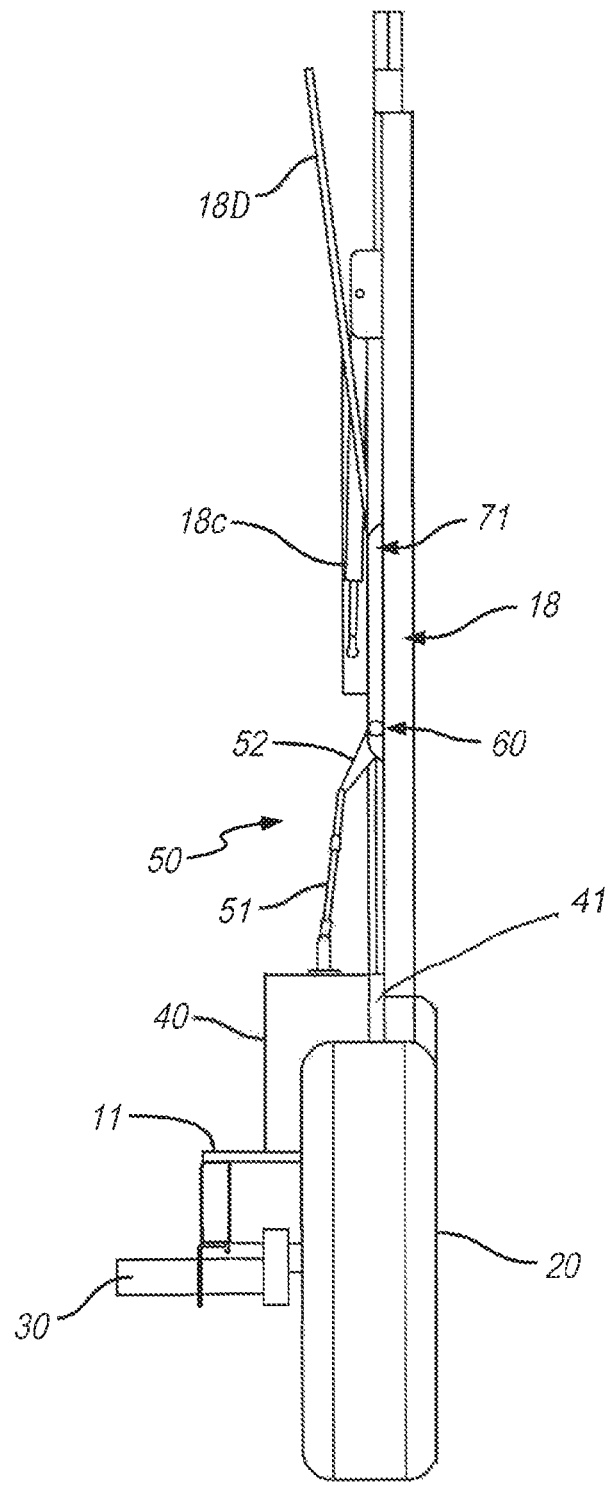
FIG. 12 is a partial front elevational view of FIG. 11.
Figure 13:
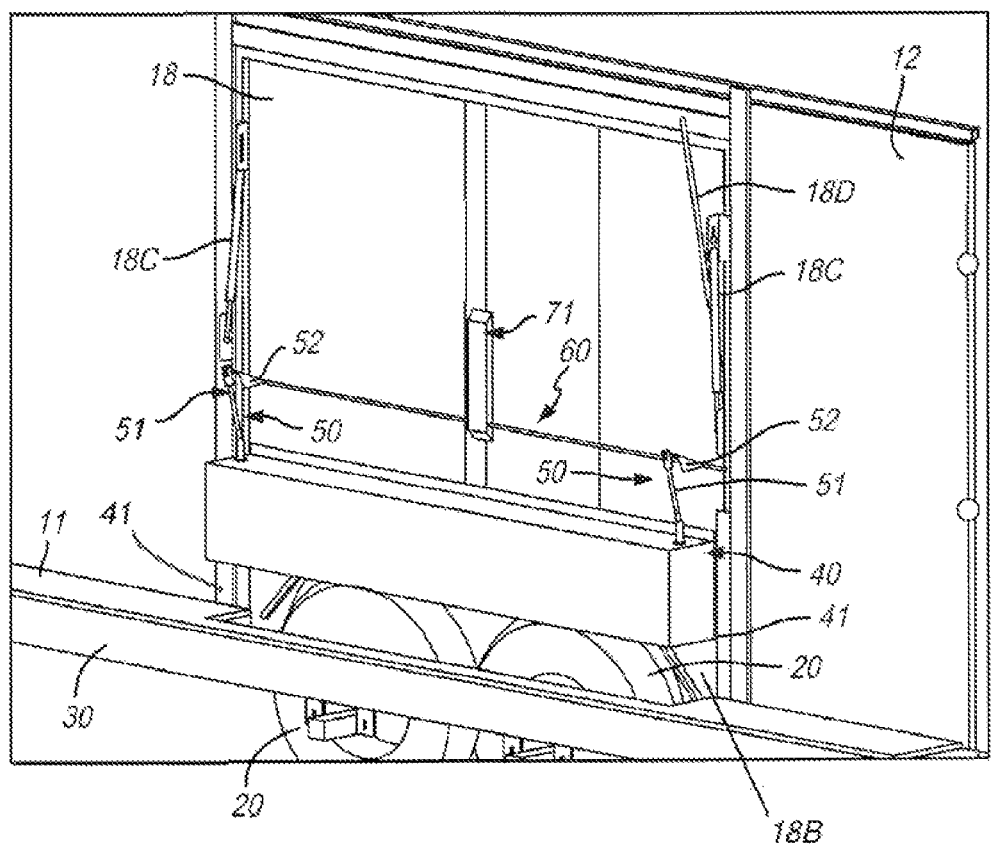
FIG. 13 is an interior perspective view of the trailer with a fender box shown in FIG. 11 with the fender box in a partially raised position.
Figure 14:
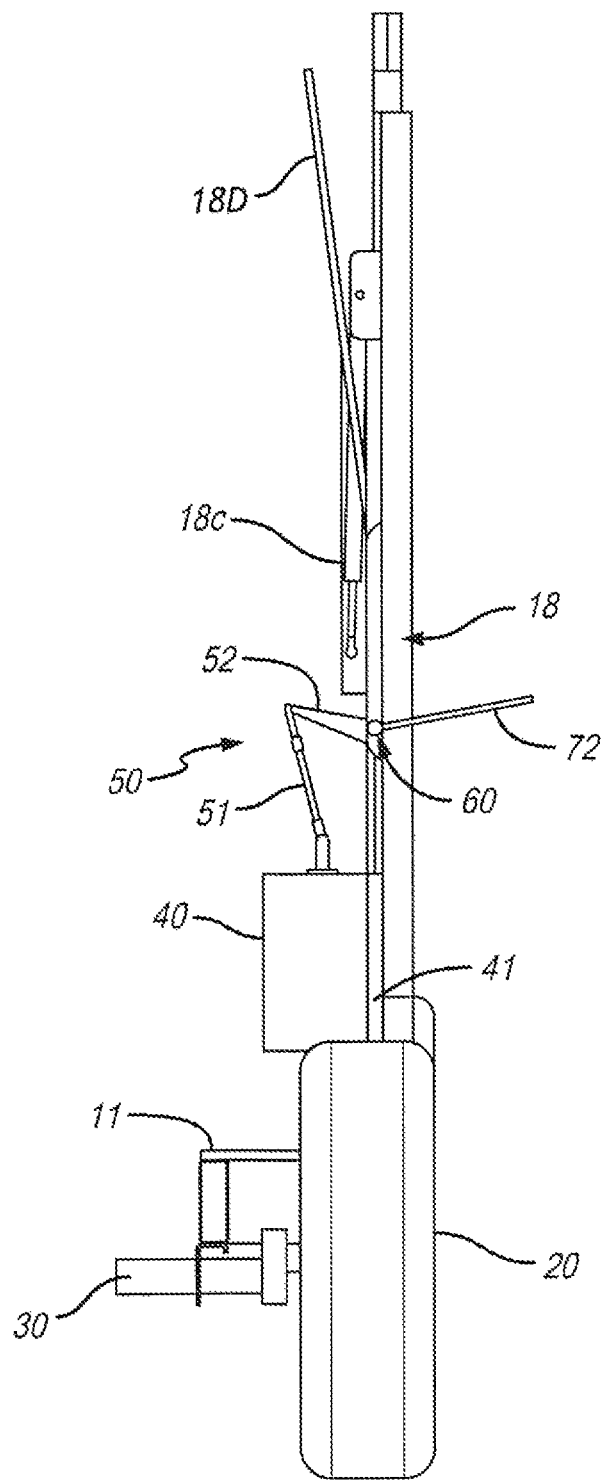
FIG. 14 is a is a partial front elevational view of FIG. 13
Figure 15:
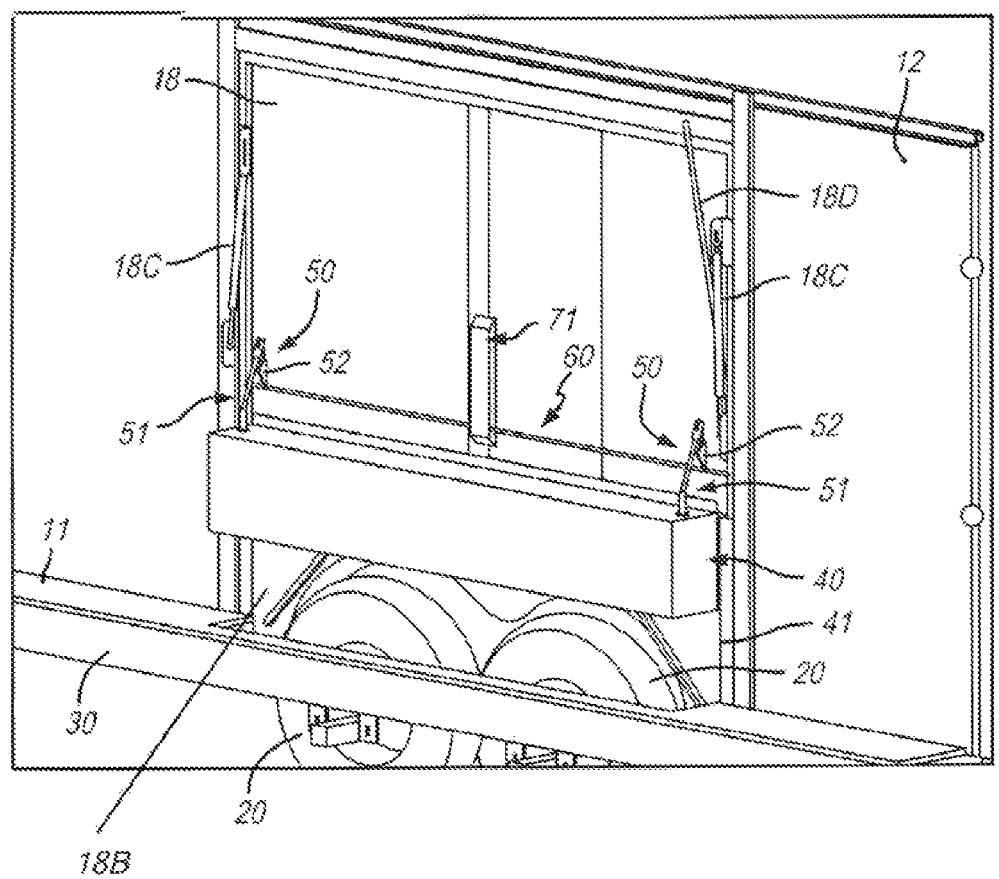
FIG. 15 is an interior perspective view of the trailer with a fender box shown in FIG. 11 with the fender box in the fully raised position.
Figure 16:
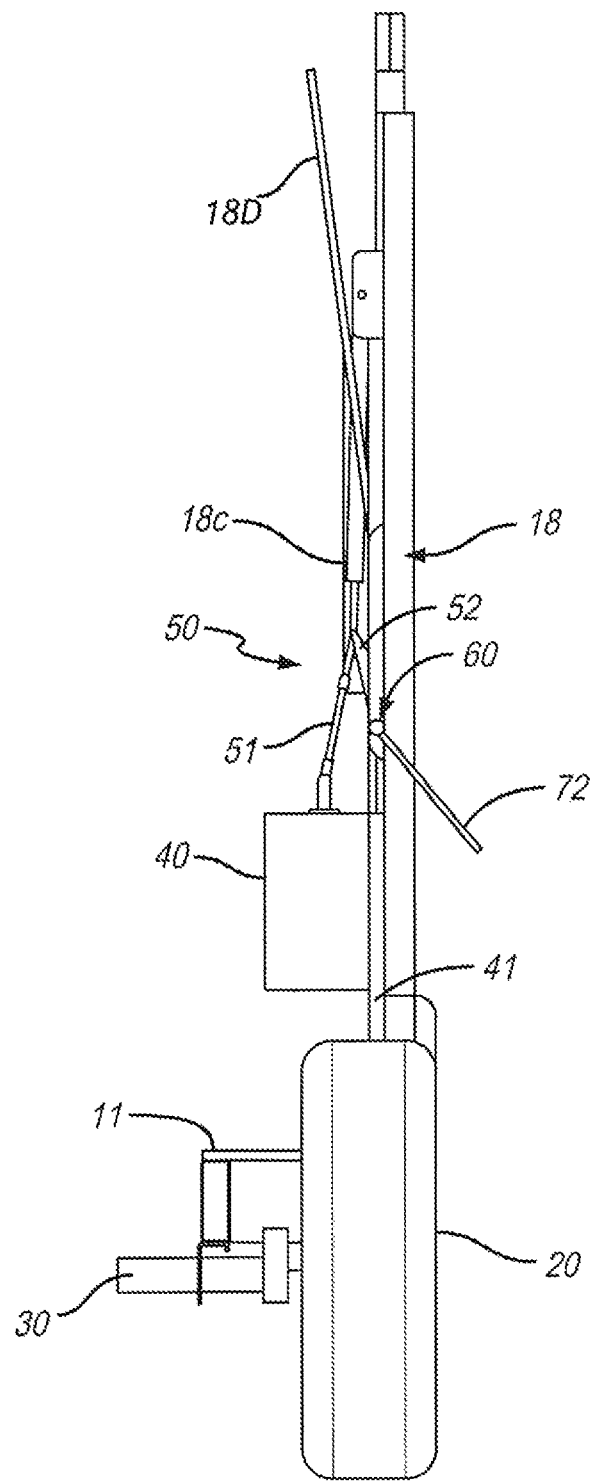
FIG. 16 is a is a partial front elevational view of FIG. 15
Figure 17:
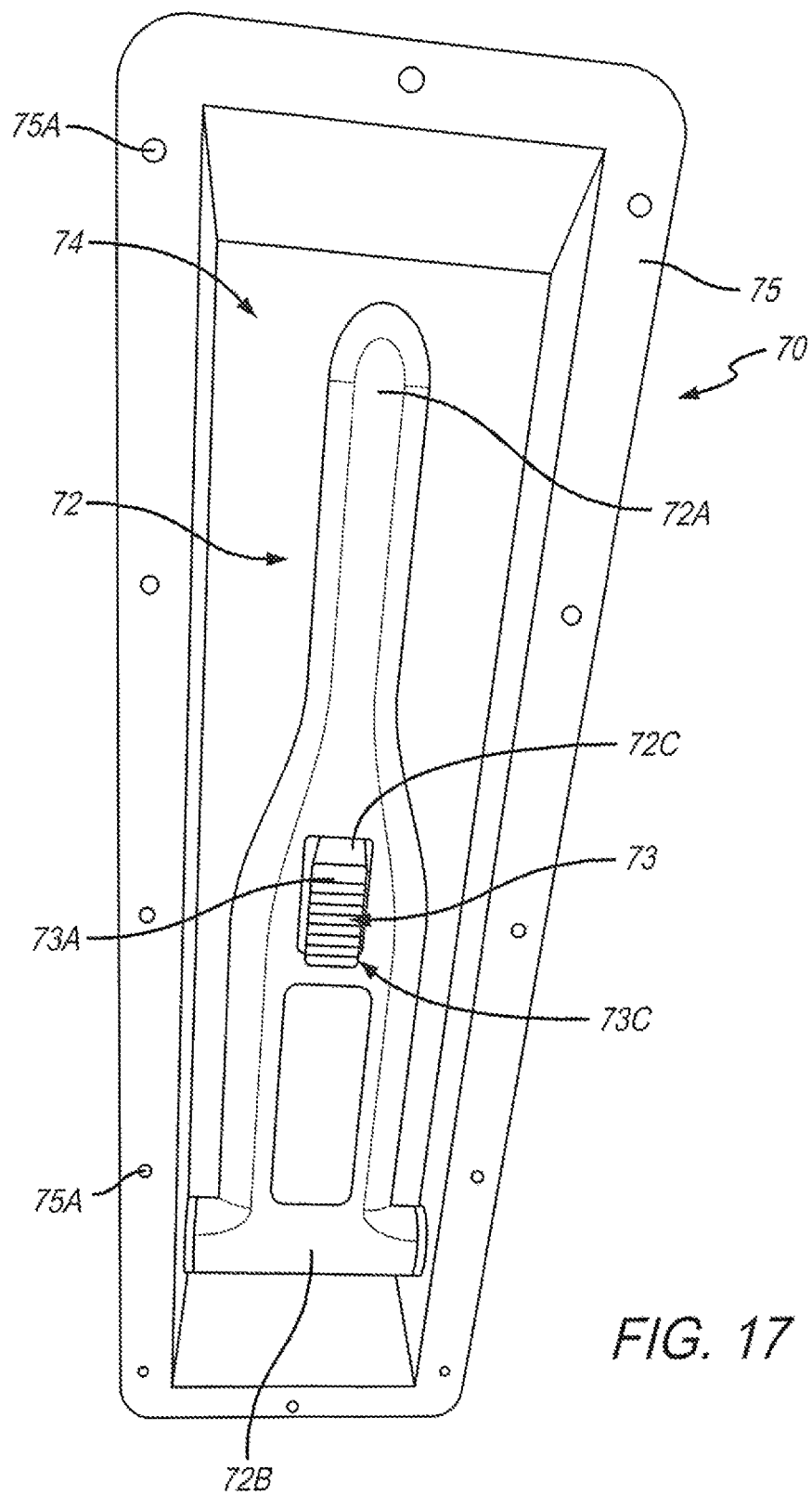
FIG. 17 is a plan view of a handle assembly that is a component of the trailer with a fender box shown in FIG. 11.
Figure 18:
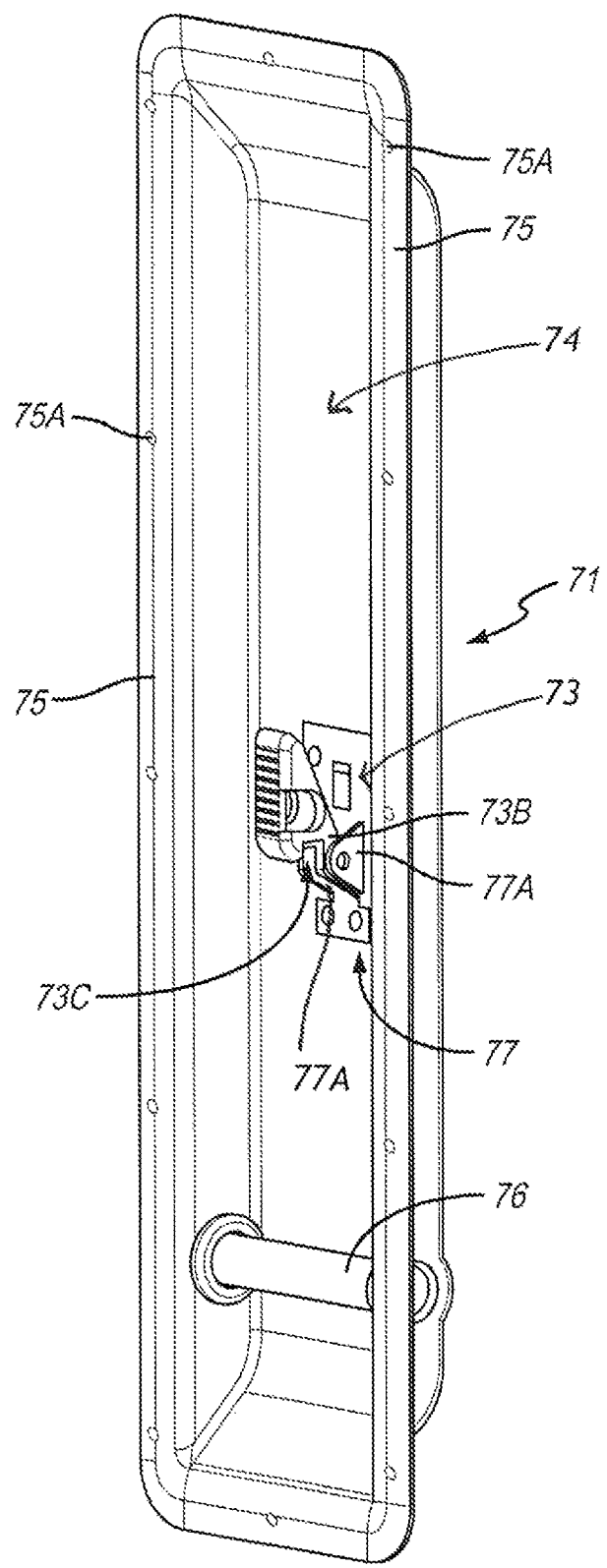
FIG. 18 is a perspective view of the handle assembly of FIG. 17 with the handle removed.

FIG. 9 illustrates a trailer with fender boxes according to another embodiment of the present invention. In this embodiment, fender boxes 40 are connected to frame 30 by a pair of slide mechanisms 41A, each of which includes a first member 41B, a second member 41C, and a third member 41D. Third member 41D has a first section 41E and a second section 41F. (FIG. 10) First member 41B of slide mechanism 41A has a first end 42A pivotally connected to frame 30 and a second end 43A connected to second member 41C of slide mechanism 41A. Second member 41C is fixed with respect to first member 41B. Second member 41C of slide mechanism 41A is connected to first section 41E of third member 41D such that first section 41E can slide relative to second member 41C and second section 41F of third member 41D can slide with respect to first member 41E. Second section 41F of third member 41D is connected to fender box 40. Fender box 40 can be positioned outside of trailer 10 by raising fender box 40 upward via slide mechanisms 41A and pivoting fender box 40 outwardly through side wall opening 18B as described above. If desired, fender box 40 can then be moved along slide mechanisms 41A so as to be positioned adjacent wheels 20 for use as a step.

FIGS. 11-18 illustrate another embodiment of the present invention. This embodiment of the invention includes a pair of linkages 50, a drive shaft 60 and a handle assembly 70.

Each linkage 50 includes a first member 51 and a second member 52. First member 51 of each linkage 50 has a first end 53 connected to fender box 40 and a second end 54 pivotally connected to a first end 55 of second member 52. Each second member 52 includes a second end 56 connected to drive shaft 60.

Drive shaft 60 includes a first end 61 and a second end 62. Drive shaft 60 extends through handle assembly 70 as described in greater detail below.

Handle assembly 70 includes a housing 71, a handle 72 and a latch 73. Housing 71 has a recessed area 74, a surrounding face plate 75 having openings 75A therein, and a linking shaft 76. Drive shaft 60 extends into and is connected to linking shaft 76. Recessed area 74 extends through door 18 into the interior of the trailer. Face plate 75 is secured to the exterior side of door 18 by inserting screws, rivets or other fasteners through openings 75A.

Handle 72 has a first or free end 72A, a second end 72B connected to linking shaft 76, and an opening 72C.

Latch 73 has a first or free end 73A, a second end 73B and a notch 73C. Second end 73B of latch 73 is pivotally connected to housing 71 by a bracket 77 having a pair of spaced apart projecting tabs or ears 77A. Latch 73 is biased into the position shown in FIGS. 17 and 18 by a spring or other biasing mechanism (not shown). When latch 73 is in this position, it extends through opening 72C such that a portion of the perimeter of opening 72C of handle 72 engages notch 73C. This prevents handle 72 from rotating and holds handle 72 in the position shown in FIG. 17.

To raise fender box 40, first end 73A of latch 73 is pushed toward opening 72C so as to disengage handle 72 from notch 73C, thereby releasing handle 72 so that it can rotate about second end 72B. Handle 72 is then pulled downwardly so that second end 72B rotates linking shaft 76, thereby in turn rotating drive shaft 60. As drive shaft 60 rotates, linkages 50 are driven such that first member 51 and second member 52 pivot with respect to one another at their second ends 54 and 55, thereby drawing first end 53 of first member 51 of each linkage 50 upwardly as shown in FIGS. 13-16. This in turn causes fender box 40 to move upward along slide mechanisms 41. Once fender box 40 has cleared wheels 20, door 18 may be pivoted outwardly and away from first side wall 12, as described above.

Note that once fender box 40 has cleared wheels 20 and door 18 has been pivoted outwardly past wheels 20, handle 72 can be released to return fender box 40 to its lowered position on slide mechanisms 41. Alternatively, a locking mechanism, such as an in line torsion spring associated with drive shaft 60, can be utilized to hold fender box 40 in a desired raised position. Other locking or securing mechanisms can be utilized to hold fender box 40 in a desired raised position prior to or after pivoting door 18 away from first side wall 12.

Although the present invention has been shown and described in detail the same is by way of example only and is not to be taken as a limitation on the invention. Various modifications can be made to the embodiments shown without departing from the invention. For example, use of the present invention is not limited to enclosed trailers. The present invention can also be utilized with open trailers. Furthermore, in the embodiment of FIGS. 6-8, door 18 could be hinged along one of its sides so as to open to the left or right or along the bottom so as to open downwardly, as opposed to being hinged along the top to open upwardly as shown. In other embodiments, gas springs or other assist mechanisms can be utilized to facilitate movement of fender box 40 and/or to hold fender box 40 in the desired position.

The invention claimed is:

1. A vehicle, including:
    a floor, a front wall, a rear wall, a first side wall, a second side wall, an opening in one of the side walls for providing access to an interior of the vehicle and a door attached to the side wall with the opening from an open position to a closed position for selectively providing access to an interior of the vehicle through the opening];
    a fender box moveable from a lowered position within the vehicle to a raised position within the vehicle[and from a first position in which the fender box is located inside the vehicle to a second position in which the fender box is located outside the vehicle];
    first and second slide mechanisms connected to the door and to the fender box such that the fender box is movable along the first and second slide mechanisms as the fender box moves from the lowered position to the raised position;
    a first linkage having a first member and a second member, each of the first and second members having a first end and a second end, the first end of the first member connected to the fender box and the second end of the first member pivotally connected to the first end of the second member;
    a second linkage having a first member and a second member, each of the first and second members having a first end and a second end, the first end of the first member connected to the fender box and the second end of the first member pivotally connected to the first end of the second member;
    a drive shaft connected to the first linkage and to the second linkage; and
    a handle assembly, the handle assembly including a housing, a linking shaft connected to the housing and to the drive shaft, and a handle having a first end connected to the linking shaft.

2. The vehicle according to claim 1, wherein the handle assembly further includes a latch for retaining the handle in a first position and for releasing the handle from the first position so as to permit rotation of the handle.

3. The vehicle according to claim 2, wherein the handle assembly latch is pivotally connected to the housing.

4. The vehicle according to claim 2, wherein the handle includes an opening and the latch extends through the opening in the handle.

5. The vehicle according to claim 2, wherein the latch includes a notch for engaging a portion of the handle when the handle is in the first position.

6. The vehicle according to claim 1, wherein rotating the handle rotates the drive shaft, thereby causing the first and second members of the first and second linkages to pivot with respect to each other and move the fender box from the lowered position to the raised position.

7. The vehicle according to claim 1, wherein rotating the handle rotates the linking shaft and the drive shaft, thereby causing the first and second members of the first and second linkages to pivot with respect to each other and move the fender box from the lowered position to the raised position.

8. The vehicle according to claim 1, further including a locking mechanism for retaining the fender box in the raised position.

9. The vehicle according to claim 8, wherein the locking mechanism includes a torsion spring.

\* \* \* \* \*